(12) United States Patent  (10) Patent No.: US 7,295,181 B2
Alsio  (45) Date of Patent: Nov. 13, 2007

(54) DATA INPUT DEVICE

(76) Inventor: Gunilla Alsio, Katrinebacken 16, 117 61 Stockholm (SE)

( * ) Notice: Subject to any disclaimer, the term of this patent is extended or adjusted under 35 U.S.C. 154(b) by 774 days.

(21) Appl. No.: 10/486,611

(22) PCT Filed: Sep. 4, 2002

(86) PCT No.: PCT/SE02/01586

§ 371 (c)(1),
(2), (4) Date: Feb. 10, 2004

(87) PCT Pub. No.: WO03/021412

PCT Pub. Date: Mar. 13, 2003

(65) Prior Publication Data

US 2004/0236440 A1  Nov. 25, 2004

Related U.S. Application Data

(60) Provisional application No. 60/317,727, filed on Sep. 6, 2001.

(51) Int. Cl.
*G09G 5/00* (2006.01)

(52) U.S. Cl. .................... 345/156; 341/22; 340/825.19

(58) Field of Classification Search ........ 345/156–184; 700/83, 84, 162, 252; 711/169; 910/73; 340/825.19; 341/20–22
See application file for complete search history.

(56) References Cited

U.S. PATENT DOCUMENTS

| 4,414,537 | A | * | 11/1983 | Grimes ........................ 341/20 |
| 5,697,285 | A | * | 12/1997 | Nappi et al. .................. 91/519 |
| 5,796,354 | A | * | 8/1998 | Cartabiano et al. ........... 341/22 |
| 6,049,327 | A | * | 4/2000 | Walker et al. ............... 345/158 |
| 6,141,643 | A | * | 10/2000 | Harmon ...................... 704/271 |
| 6,304,840 | B1 | * | 10/2001 | Vance et al. .................. 703/21 |
| 6,380,923 | B1 | * | 4/2002 | Fukumoto et al. .......... 345/156 |
| 6,437,794 | B1 | * | 8/2002 | Ohshima et al. ............ 345/619 |
| 6,515,669 | B1 | * | 2/2003 | Mohri ........................ 345/474 |
| 6,748,281 | B2 | * | 6/2004 | Alsio .......................... 700/83 |
| 7,092,785 | B2 | * | 8/2006 | Alsio et al. ................. 700/168 |
| 2001/0040550 | A1 | * | 11/2001 | Vance et al. ................. 345/156 |
| 2003/0179224 | A1 | * | 9/2003 | Alsio ......................... 345/702 |
| 2005/0172734 | A1 | * | 8/2005 | Alsio et al. ................ 73/865.4 |
| 2005/0179644 | A1 | * | 8/2005 | Alsio et al. ................. 345/156 |

* cited by examiner

*Primary Examiner*—Alexander Eisen
*Assistant Examiner*—Cory Almeida
(74) *Attorney, Agent, or Firm*—Fasth Law Offices; Rolf Fasth

(57) ABSTRACT

The method is for entering data into a computer device and comprises providing a wearable device (10) that is attached to a hand. The device (10) has sensors (49, 51, 53, 55, 57) that analyze the movements of the segments (48, 50, 52, 54, 56) to generate likely characters intended by the user. The device (10) learns from the earlier typing patterns of the user to eliminate possible characters.

5 Claims, 6 Drawing Sheets

DATA INPUT DEVICE

PRIOR APPLICATIONS

This is a U.S. national phase patent application that claims priority from PCT/SE02/01586, filed 4 Sep. 2002, that claims priority from U.S. Provisional Patent Application Ser. No. 60/317,727 filed 6 Sep. 2001.

TECHNICAL FIELD

The present invention relates to a data input device that may involve movements of the metacarpophalangeal joints of the hands for information input activities.

BACKGROUND AND SUMMARY OF THE INVENTION

Conventional data input interfaces with computers most often requires keyboards. It is sometimes cumbersome to use keyboards especially if the computer or communication device is very small so that each letter or command button is also very small. For example, it is very inconvenient to enter text messages into a mobile phone of PDA because the devices are so small. In other situations, it is simply inconvenient to use a conventional keyboard because there is not sufficient room for the user to use the relatively large keyboards. There is a need for a convenient and reliable way of entering in data into a computer device. More particularly, the present invention is a method for entering data into a computer device and comprises the steps of providing a wearable device that is attached to a hand. The device has sensors that analyze the movements of the hands and fingers to generate likely characters or commands intended by the user. The device learns from the earlier movement patterns of the user to eliminate possible characters or commands. Syntactic and semantic rules may be used for text entry when analyzing the data and the likely character or command intended by the user when the user moves the fingers to activate one or many of the segments.

DETAILED DESCRIPTION

Figure 1:
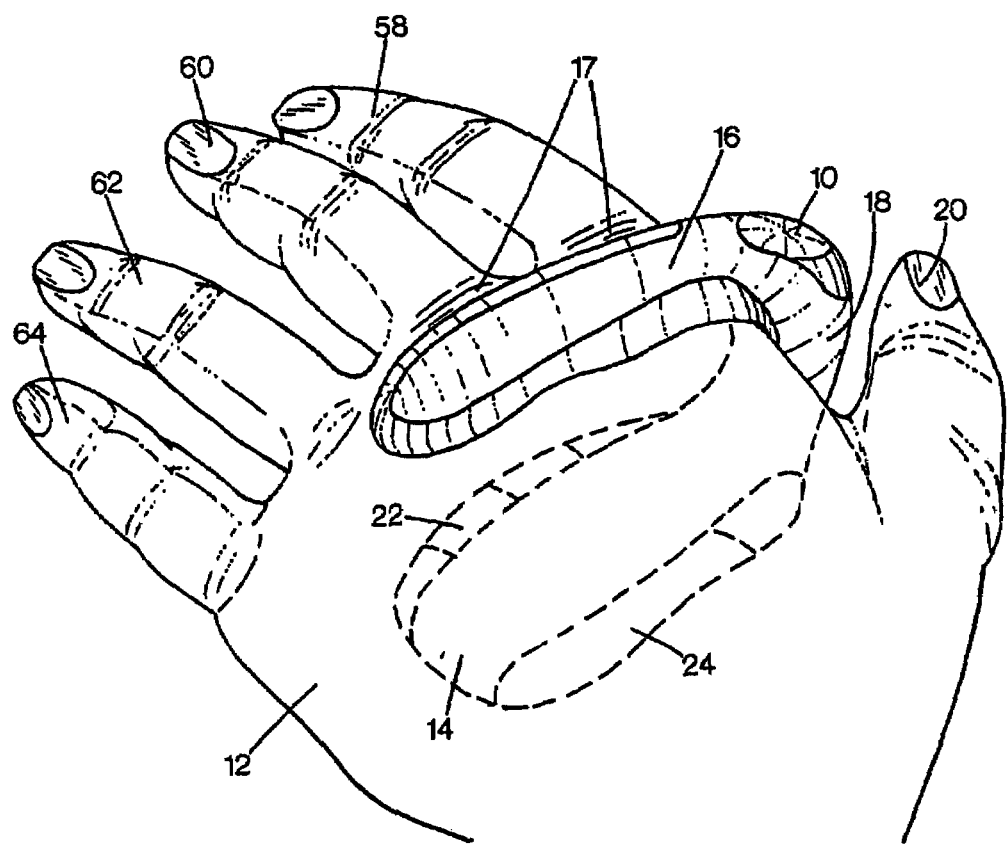
FIG. 1 is a perspective view of the handheld device of the present invention mounted on a left hand.

With reference to FIGS. 1-6, the present invention is a data input device 10 for entering information into, for example, a computer connected to the device 10 without using a conventional keyboard. For example, the information may include text information such as a typing or remote control of certain functions of a machine. The device may be handheld and a modified version of the device may be worn on the wrist or any other suitable place.

The device 10 may be mounted, for example, to a hand 12 so that a lower unit 14 is placed below palm and finger sections of the hand 12 and the upper unit 16 is placed above the hand 12 behind the knuckles 17. The unit 16 may include a PDA or a small display for showing, for example, what is being typed. Preferably, the units 14, 16 are connected by a connecting portion 18 disposed inside a thumb 20. The preferred position of the device 10 in the hand 12 is explained in detail below.

The lower unit 14 has a front rounded flexible portion 22 and a rear rounded portion 24 attached thereto. More particularly, the portion 22 has a groove 26 defined therein and lower and upper parts of the portion 22 may be applied against front edges 28 of a solid lower housing 30. Similarly, the portion 24 has a groove defined therein and the portion 24 may be applied to back edges 32 of the housing 30. The housing 30 has an upright back 34 having a cavity 36 defined therein for receiving a cylinder part 38. The housing 30 has also a short upright front 35. An upper end 40 of the back 34 has a groove 42 defined therein.

A sensor device 44 may be placed in the housing 30. The device 44 has a flexible printed circuit board 46 including a first protrusion 48, a second protrusion 50, a third protrusion 52, a fourth protrusion 54 and a fifth protrusion 56. The protrusions have strain gauge segments 49, 51, 53, 55, 57, respectively, sensitive to movements and continuously register movements of the protrusions. It is through this continuous measurement of the position of the protrusions that it is possible to draw the conclusion that a finger has moved. It is therefore not necessary to rely on only one movement to conclude that a movement has been made. Preferably, the protrusions are positioned below the palm 106 and a distal portion 97 of the hand 12 while the protrusion 54 extends towards an index finger 58, the protrusion 52 extends towards a middle finger 60, the protrusion 50 extends towards a ring finger 62 and the protrusion 48 extends towards a little finger 64. However, it is possible to use more or fewer than five sensors. The present invention is not limited to one sensor per finger since the system considers the movement of all the fingers, as explained below. Other sensors than strain gauges may be used and these may register movements or accelerations depending upon the sensor technique that is used. For other sensors than strain gauges protrusions might not be necessary.

As indicated above, the board 46 may be used to register movements of the fingers of the hand 12. Preferably, the protrusions 48, 50, 52, 54 and 56 are easier to bend compared to a central section 66 of the board 46. The protrusions may be separated by cavities so that the movement of one protrusion is not unduly affected by the movement of an adjacent protrusion. However, as explained below, the device 10 takes the movements of all the fingers into the account before it determines which letter or command the user intended to activate. In this way, not only the movement of the active finger but also the movement of adjacent fingers are used when determining which letter or command the user intended.

Figure 2:
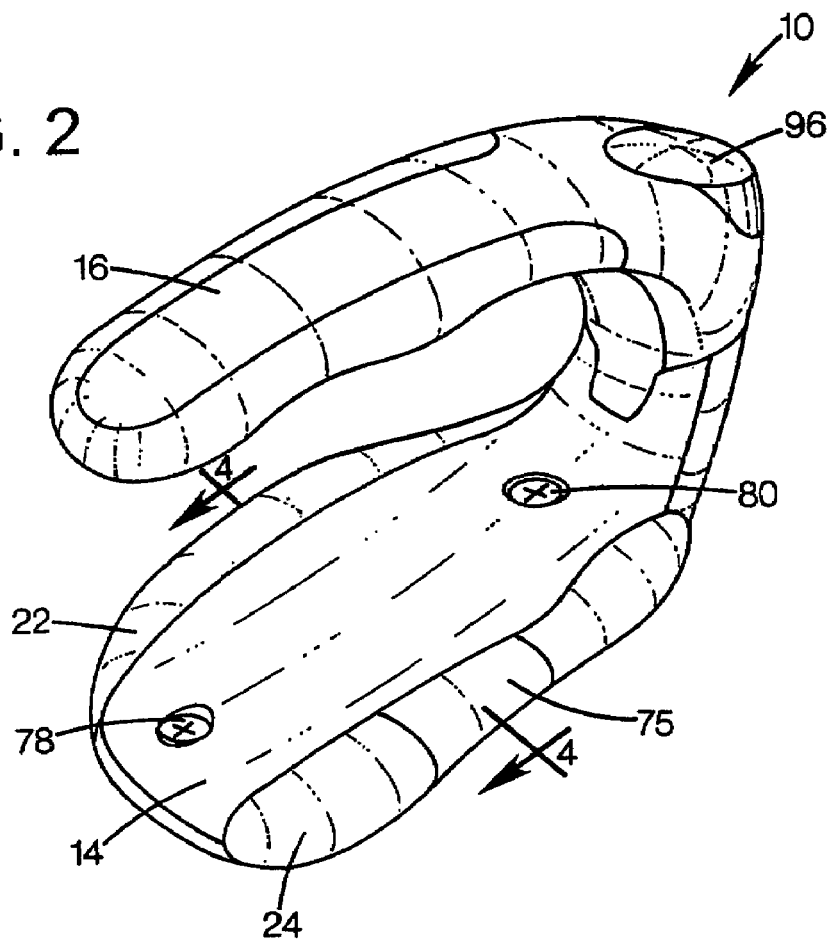
FIG. 2 is a perspective view of the handheld device of FIG. 1.
Figure 4:
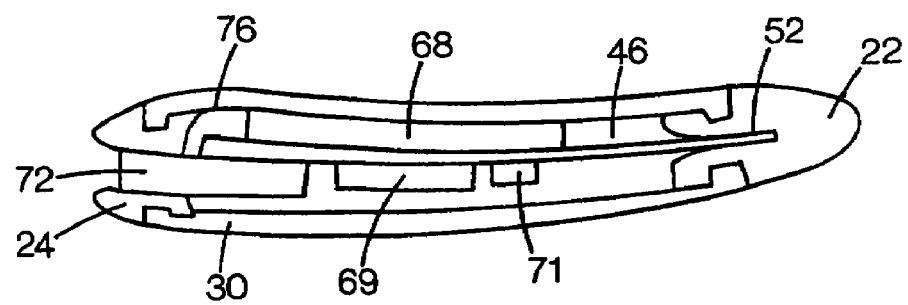
FIG. 4 is a cross-sectional view of the handheld device along line 4-4 of FIG. 2.
Figure 3:
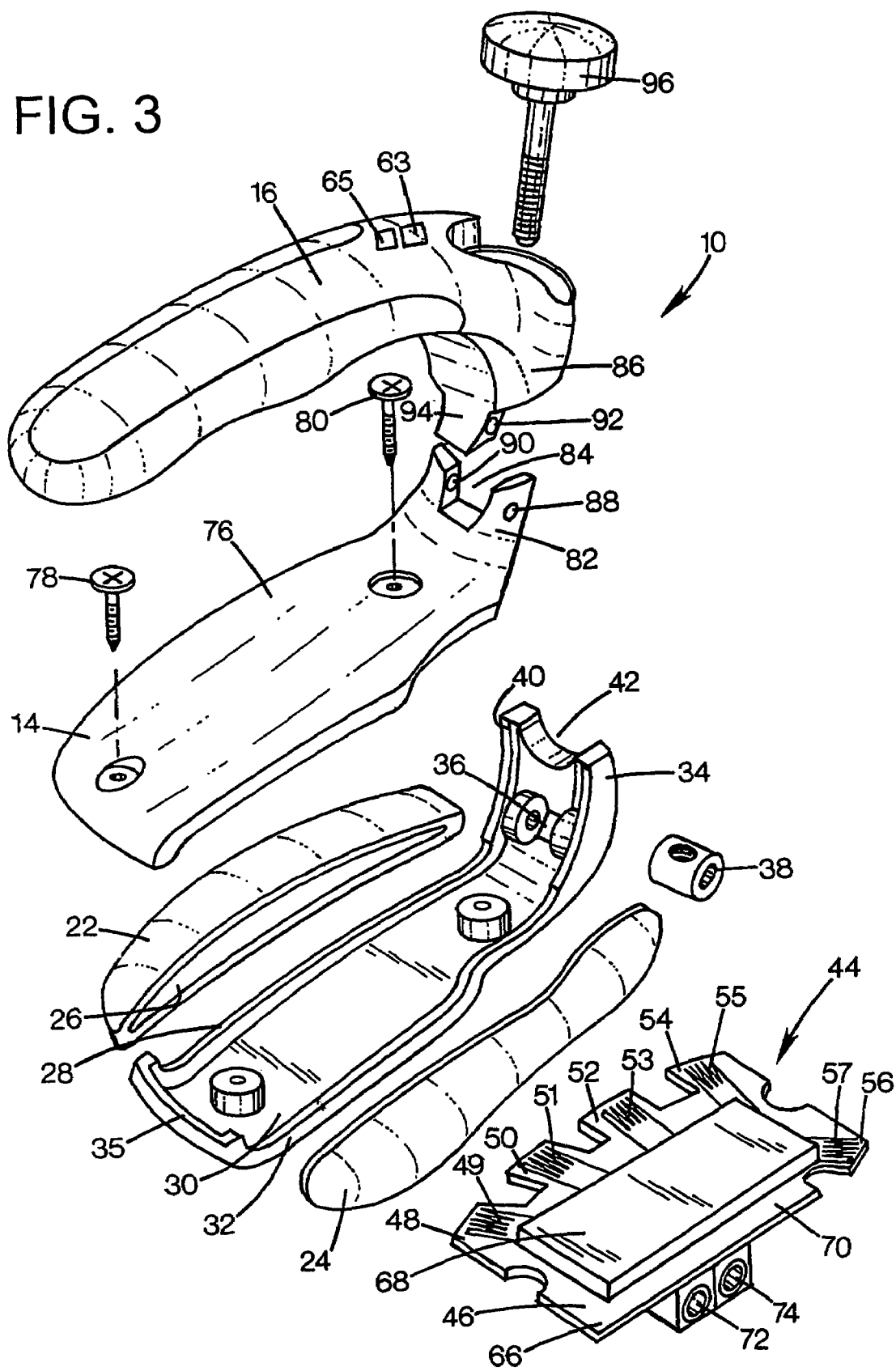
FIG. 3 is a perspective exploded view of the handheld device of FIG. 2.

The central section 66 has a stiff or bendable battery unit 68 that is in operative engagement with a computer-processing unit 69 on the section 66. The invention is not limited to battery units and any suitable power source may be used. The section 66 may also have a converter 71 that converts analog signals to digital signals. The device 44 is dimensioned so that it may fit on top of the housing 30 and between the portions 22, 24 when the portions 22, 24 are attached to the housing 30. The protrusions 48, 50, 52, 54 may be inserted into the groove 26 of the portion 22 and a back edge 70 of the board 46 may be captured between the housing 30 and a top cover 76. The sensor device 44 has a DC input connector 72 and a communication port 74 disposed below and attached to the board 46. The connector 72 may be used to recharge the battery 68 or to power the device 10 and the port 74 may be used to connect the device 10 to a computer or any other suitable device that can receive signals produced by the device 10. The connector 72 and port 74 may be hidden behind an openable lid 75, as best seen in FIG. 2. The device 10 may also be connected to a computer by wireless technology such as Bluetooth radio technology or any other radio technology or any other suitable wireless technology.

The device 10 has the cover 76 placed on top of the sensor device 44 and attached to the housing 30 by screws 78, 80 to firmly hold the device 44 between the housing 30 and the cover 76. The various pieces may also be adhered together so that the screws are not necessary. The cover 76 has an upright back 82 having a cavity 84 defined therein. The upper unit 16 has a back 86 that may be attached to the back 82 in the cavity 84 thereof. The back 86 may be pivotally attached to the back 82 by inserting a pivot pin through openings 88, 90 of the back 82 and an opening 92 of a lower end 94 of the back 86. An adjustment screw 96 may be attached to the device 10 to adjust the gap between the units 14, 16 to accommodate the device 10 to different hand sizes. If desired, the device 10 may be attached directly to a PDA.

Figure 5:
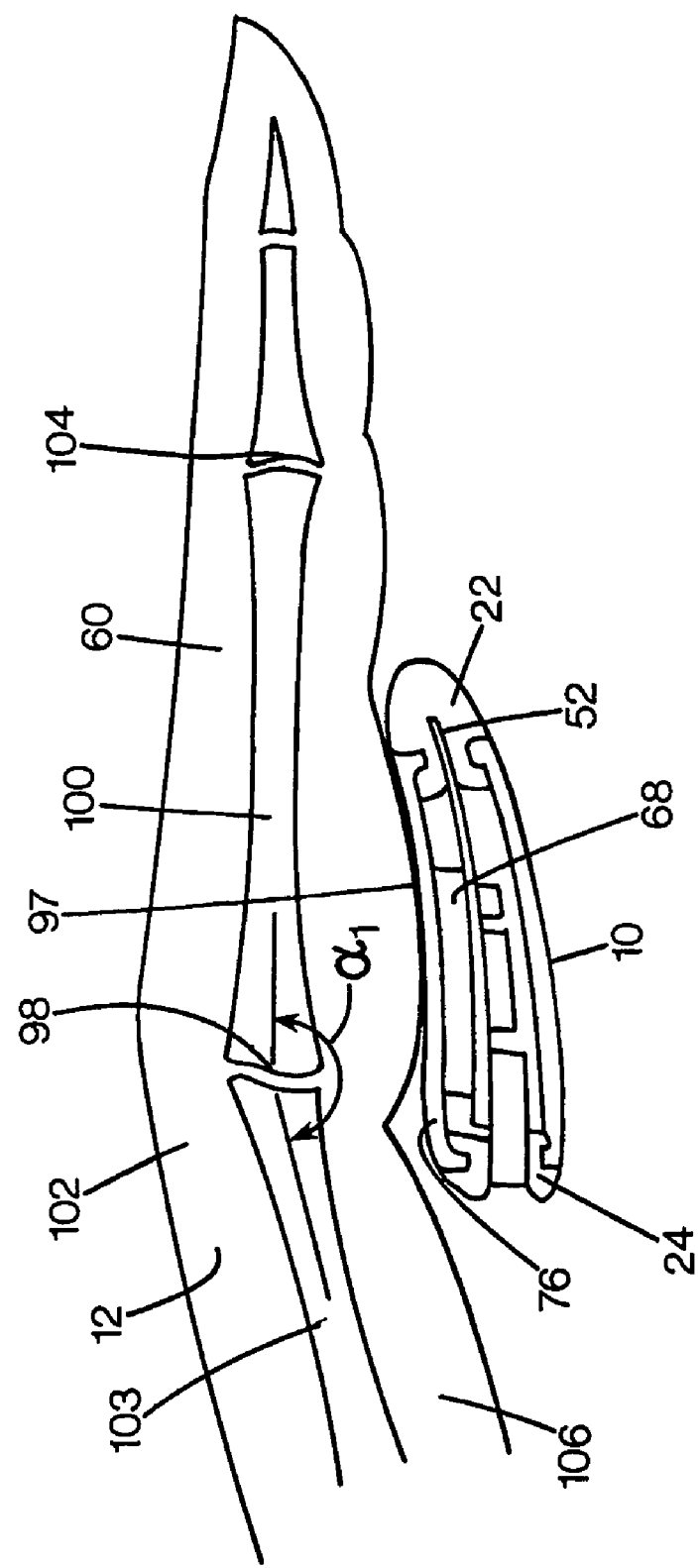
FIG. 5 is a cross-sectional view of the handheld device with a finger resting on the device.
Figure 6:
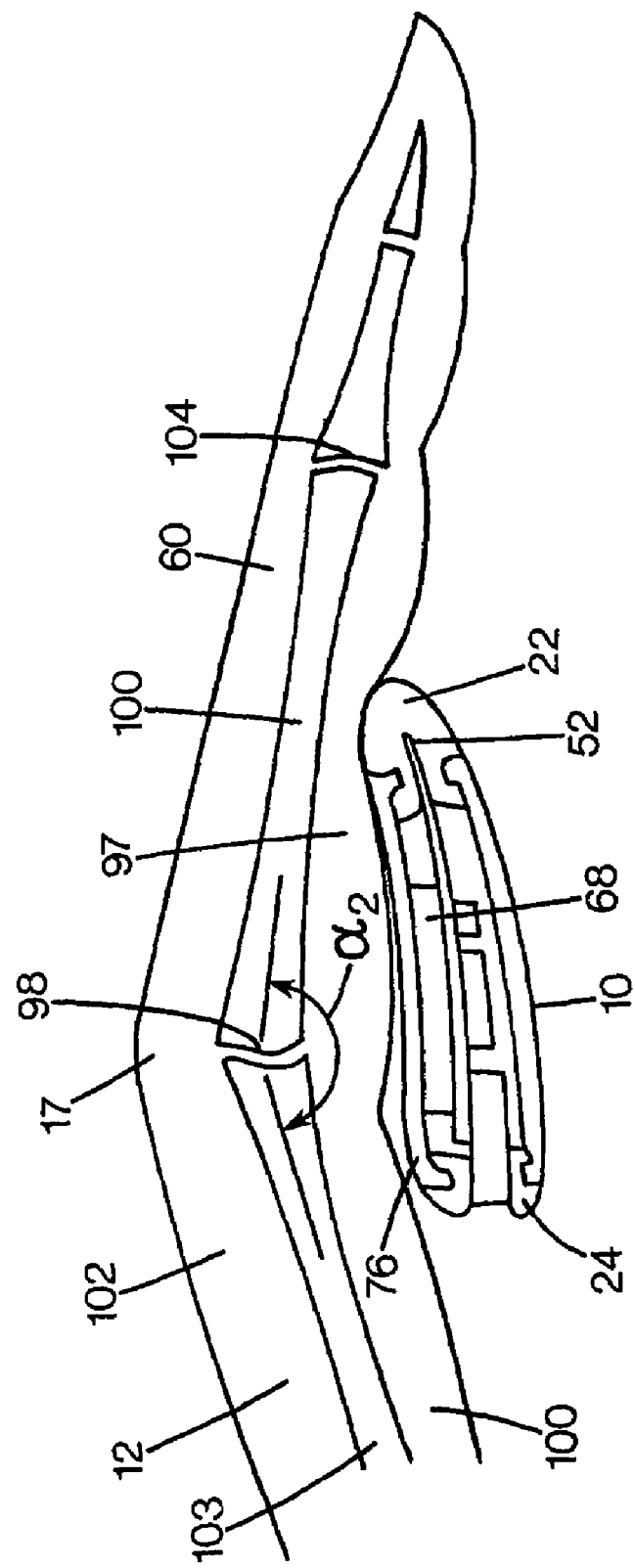
FIG. 6 is a cross-sectional view of the handheld device with a finger applying a pressure on a front end of the handheld device.

FIGS. 5-6 show a hand and a finger, such as a distal portion 97 of the palm 106 bearing against the device 10 and a finger 60. More particularly, the device 10 is placed below a metacarpophalangeal (MCP) joint 98 so that the device 10 may register movements of the finger portion 100 relative to the metacarpalia bone 103 of the hand 12. Preferably, the portion 100 rests on the cover 76 and the flexible portion 22. The portion 22 should be positioned between the joint 98 and a finger joint 104 so that the portion 22 is positioned about half way along the proximal phalanx and beyond the metacarpophalangeal joint of each finger. When the portion 100 is moved downwardly relative to the bone 103 to reduce an angle alpha 1 (see FIG. 5) to an angle alpha 2 (see FIG. 6), the portion 22 is deformed proportionally to the changes in the metacarpophalangeal joint angle and the protrusion 52 is bent slightly and proportionally in a downward direction. More particularly, movements of the metacarpophalangeal joint 98, disposed between the proximal phalanx 100 and the metacarpalia bone 103 of the hand 12, is measured. For example, when the middle finger 60 moves downwardly by a movement in the metacarpophalangeal joint 98, the portion 22 bears against the palm portion 97 of the proximal phalanx of the middle finger 60 and the portion 22 is deformed proportionally to the changes in size of the metacarpophalangeal joint angle so that the sensor 53 can continuously register the different positions. The angle alpha 1 may be close to 180 degrees or slightly less. The sensor 53 registers the bending of the protrusion. It is to be understood that the finger 60 is used as an example and the same principle applies to all the protrusions and fingers.

Because the portions 22, 24 are made of a flexible material, the protrusions 48, 50, 52, 54 and 56 are permitted to move when the portion 22 is moved by the fingers 58, 60, 62, 64 and the portion 24 is moved by the thumb 20. If another sensor technique than strain gauges is used other parts than the portions 22, 24 could be flexible. The device 10 also has an on/off button 63 and a pause button 65. It may also be possible to deactivate the device 10 by a certain finger movement or by not using the device for a certain time.

As mentioned above, when the device 10 of the present invention is used as a text input device, it is not necessary that the user is actually using a conventional keyboard. It is sufficient to move the fingers as if the user is typing such as by pressing the fingers against a table surface or thigh to move the proximal phalanx of a finger and thereby changing the angle of the metacarpophalangeal joints of the hands. Because the sensors are continuously sending signals and these signals are continuously measured, it is possible preset a signaling level that will trigger an event that a finger impact has occurred. It is important to note that it is not necessary for the user or operator to hit a specific spot on the table or whatever surface the fingers are hitting. It is enough to make a sufficient movement in the metacarpophalangeal joints to transmit a signal regardless where on the table surface the fingertips hit.

It may also be possible to adjust the device 10 so that the sensors are placed on top of each finger to measure the movements of the joints and fingers. One advantage of having the device 10 on the back of the hand is that it frees up the inside of the hand for other tasks. In this way, all the measurements of the finger movements are performed on the back of the hand and the fingers. For certain sensor techniques, another advantage of placing the sensors on top of the fingers may be that it could be easier to register changes in the angle of the metacarpophalangeal joints of the fingers.

Figure 7:
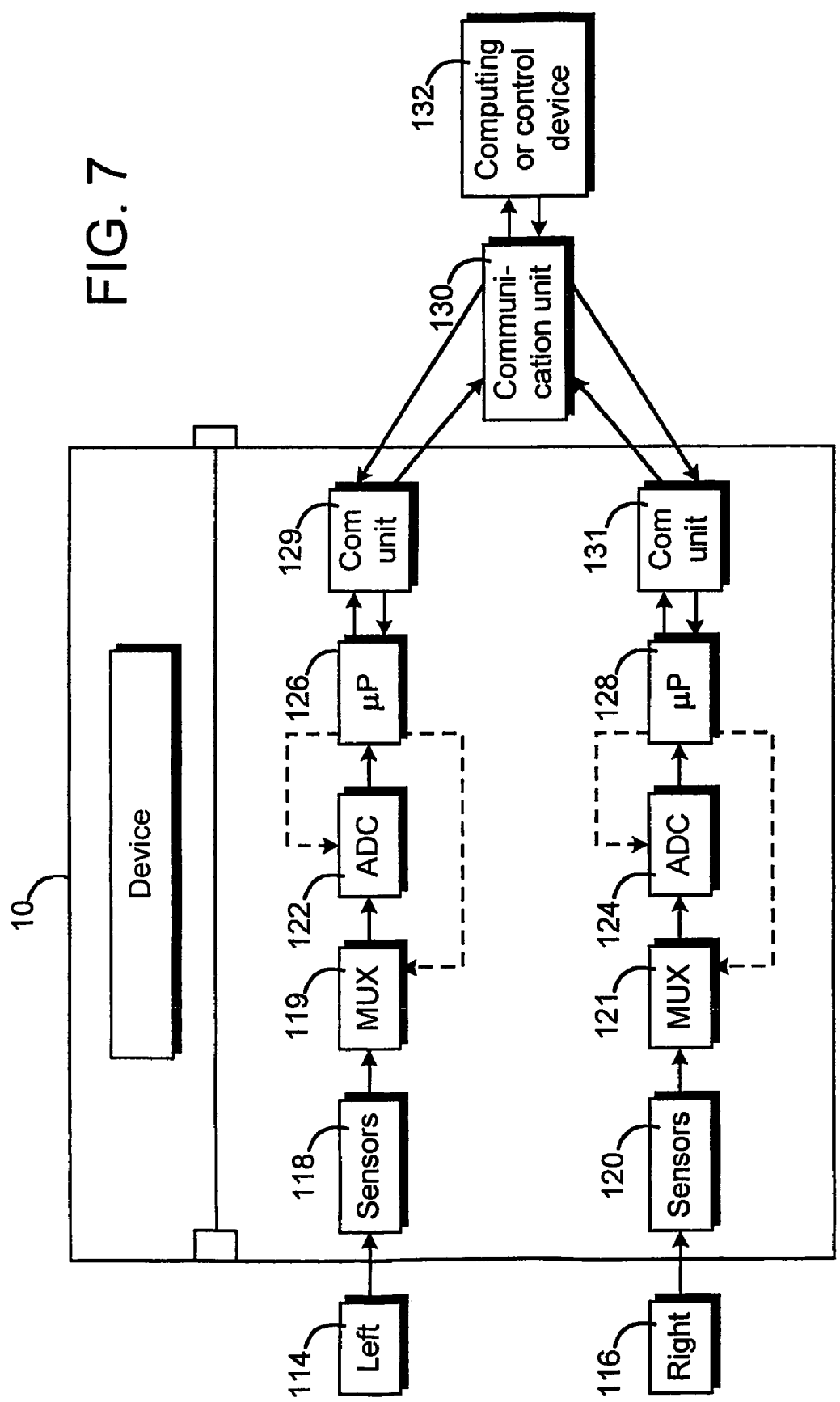
FIG. 7 is a schematic flow diagram of the information flow of the present invention.

FIG. 7 is a schematic diagram showing the information flow within the present invention. The device 10 is connected to a left side portion 114, corresponding to the hand and fingers of a left hand of a user, and a right side portion 116, corresponding to the hand and fingers of a right hand of the user. The portions 114, 116 are in operative engagement with sensors 118, 120, respectively, to activate the sensors so that the sensors 118, 120 may continuously send signals, as a result of registered movements by the portions 114, 116. The sensors may correspond to the protrusions 48, 50, 52, 54, 56 on the board 46. The sensors 118, 120 continuously send signals to multi-plexer units 119, 121, respectively. The units 119, 121 are hardware devices that enable two or more signals to be transmitted over the same circuit at the same time by temporarily combining them into a single signal. On the receiving end, the signals are divided again by a demultiplexer that may be part of the microprocessors 126, 128. The processors may guide and distribute the tasks as is symbolized with dashed lines in FIG. 7. Values are continuously being sent from the sensors to the multi-plexer units that in turn send instructions to both the sensors and the multiplexer units. The analog digital converters 122, 124, respectively, convert the analog signals from the sensors to digital signals before the signals are forwarded to the microprocessors 126, 128. The micro-processors 126, 128 process the signals in mathematical operations, such as an artificial neural network system or any other artificial learning system, before the signals are sent via a communication unit 130 to a computing device 132 such as a computer, PDA, telephone or any other control device. Communication units 129, 131 are connected to the microprocessors 126, 128, respectively. The units 129, 131 are then connected to the communication unit 130. The unit 130 may be connected to the receiver via any suitable communication technology such as infrared, sound, cable or radio-transmission. The computing device 132 may then display the text if the device 10 is used as a typing device.

The artificial neural network may remove certain letter possibilities as very unlikely and the language processor may carry on the analysis to finally determine which letter and words the user intends. The artificial neural network is particularly useful in determining which letter is intended by reviewing columns of letters. The module is quite efficient at determining sideways movement such as the difference between the letter "f" and the letter "g" on a conventional keyboard because the letters are beside one another and the letter "f", for example, is further away from the thumb compared to the letter "g." The module may also learn how most people type "f" compared to "g" by letting a large number of people use the system and record how most people use all the fingers when the user intends to type certain letters.

The language processor may also have a artificial neural network module. This module analyses the movement of not only the finger that is activated but also the other fingers when determining which letter or command the user intended. The module analyzes a pattern of signals from all the fingers and may filter away unlikely letters. The module may also store unusual finger movement patterns that are used for certain letters. The module may also learn from the user's corrections once the user sees what is being displayed. In this way, the module may be trained to recognize which letter the user intends by analyzing the movements of the hand and all the fingers in relation to one another. By using the artificial neural network, it may be possible to determine which letter the user intends without using a language processor. The module may be set so that only certain values are treated as acceptable letters and signs. In this way, the number of possible letters is drastically reduced before the language processor starts the analysis. The user may also set the input speed and whether the user is using the fingers to create a hard or relatively soft impact on a surface because the movement pattern may change depending upon how fast the user is typing and how hard the fingers are hit against a surface. It may also be possible to keep separate networks for letters and numbers. Predefined finger movements may be used to replace the function of a computer mouse. The computing device 132 may include a language processor that may elaborate input streams into words. The language processor may also be used to compose words into sentences and to display the most likely sentences. The language processor may propose possible corrections required if the sentence has ambiguities. When using a conventional keyboard, each finger may be used for three, four, six or more characters including punctuation marks and other signs. Since the dominant thumb is most often used for the space bar, the less dominant thumb may be used to activate a back space command.

Each finger stroke may be analyzed both on a lexical level and on a syntactic level. The language processor may also analyze the frequency ranking level. The lexical analysis may include pre-matching any three letters into a tri-gram dictionary. In other words, the language processor defines a tri-gram of three letter sequences that exist in at least one word in the English dictionary. One goal of the tri-gram matching is to minimize the number of searches in a dictionary of English words and the speed up the processing time because the three letter combinations that do not exist in the English language are eliminated. Words that are shorter than three words may be directly matched without using the tri-gram analysis.

When the words have more than three letters it is necessary to merge through sliding tri-grams. For every sequence of three letters, the process may establish all the possible tri-grams that can be found in a dictionary database. Any previous tri-grams may be matched with the current tri-grams and the results are stored. These steps are repeated until an empty space is encountered. When the tri-gram analysis is completed, the language processor conducts a dictionary match that results in a set of possible words. Every word in the set is then mapped into possible phrases. The resulting phrases may then be matched against possible known sentence structures.

As soon as a space is encountered, the language processor knows the length of the word. The language processor may also know which finger was used for the first letter. Groups of words that match these criteria may be ordered according to the letter configuration of a conventional keyboard i.e. q,a,z,w,s,x,e,d,c,r,f,v,t,g,b,y,h,n,u,j,m,i,k,o,l,p.)

The language processor may also analyze the typed words depending upon whether the word is a noun, verb, auxiliary, preposition etc. Some words may belong to several syntactic groups. For example, the word "can" is both a noun and an auxiliary. The language processor may determine which syntactic group should be used based on where in the sentence the word is used. When the language processor cannot determine which syntactic rule applies, the language processor may have a default setting to display the most frequently used type of words. In most cases, a sequence of finger strokes does not produce one word only but a set of words. The intended word type may be selected according to the phrase structure grammar and the word frequency.

The phrase structure grammar may employ phrases to describe the syntactic structure of a sentence by describing the sentence as a phrase structure. The phrase structures are combinations of words, such as determiner-nouns and auxiliary verbs. The structures describe the word types that make up a particular phrase. It considers the syntactic context of words by matching the adjacent word types against the phrase structures. The syntactic processor may use a simple grammar of phrase structures that could be included in a database. It parses through the input sentence to match each sentence word against the phrase structure that results in a description of phrases and word types in the sentence. After the input sentence is parsed, some sentence words could remain unmatched when, for example, the word is misspelled or the words are not represented in a phrase structure. This means that there is no phrase structure that matches the input sequence of word types. In this case, the outcome for every word in the sentence will be the most frequent word for each word set. The language processor may also simply bypass the word.

When a sentence is matched, there could still be more than one possible sentence. The frequency of every word, among the ones matching at least one sentence structure, may be used to determine which words should be displayed. The sentences may therefore be ranked based on the frequency of occurrence of each word. The sentences that have the words with the highest total score may be selected and displayed. When the language processor encounters punctuation, it may be programmed to consider the sentence as being finished and starts to perform the syntactical analysis and the highest ranked sentence may be displayed. The language processor may also conduct a semantic analysis of the sentence so that the meaning of the words is considered.

In an alternative embodiment, a remote sensor may recognize and register the sound created by the fingers hitting a surface. The sensor may distinguish between the different fingers because the fingers may have different lengths and thickness that create different sound vibrations when the fingers hit a surface.

While the present invention has been described in accordance with preferred compositions and embodiments, it is to be understood that certain substitutions and alterations may be made thereto without departing from the spirit and scope of the following claims.

I claim:

1. A method of entering data into a computer device, comprising:
   providing a wearable device (10) and attaching the wearable device (10) to a hand (12), the device (10) having a lower unit (14) placed in a palm (106) of the hand and an upper unit (16) placed behind knuckles (17) of the hand and connected to the lower unit (14), the device (10) having sensors (49, 51, 53, 55, 57) in operative engagement therewith to register movements;
   moving a first bone segment (100) relative to a second bone segment (103) at the metacarpophalangeal joint (98);
   the movement of the bone segment (100) activating at least one of the sensors (49, 51, 53, 55, 57);
   the device (10) generating and sending an activation signal (125, 127) to a computer device (132) in operative engagement with the device (10);
   the computer device (132) interpreting and converting the activation signal (125, 127) to a first command; and
   the device (10) memorizing the movements of the first bone segment (100) and the second bone segment (103) that generated the first command.

2. The method according to claim 1 wherein the method further comprises analyzing movements of each segment (49, 50, 52, 54, 56) to learn and memorize the movements of each separate segment that resulted in the generation of the first command.

3. The method according to claim 2 wherein the method further comprises analyzing a pattern of signals from each segment and filtering away unlikely commands.

4. The method according to claim 2 wherein the method further comprises the device memorizing and learning from a user's corrections when the user sees which command is being displayed on the computer device.

5. The method according to claim 2, wherein the method further comprises analyzing the size of surface impact of the user's finger when typing to determine which command the user intended to activate.

* * * * *